(12) United States Patent
Moisan

(10) Patent No.: US 12,736,369 B2
(45) Date of Patent: Sep. 15, 2026

(54) SYSTEM AND METHOD FOR SECURING VEHICLES FROM RELAY ATTACKS USING MAP DATABASE

(71) Applicant: HERE Global B.V., Eindhoven (NL)

(72) Inventor: Jeffrey Moisan, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 190 days.

(21) Appl. No.: 18/526,654

(22) Filed: Dec. 1, 2023

(65) Prior Publication Data

US 2025/0180372 A1 Jun. 5, 2025

(51) Int. Cl.
*G01C 21/00* (2006.01)

(52) U.S. Cl.
CPC ..... *G01C 21/3885* (2020.08); *G01C 21/3848* (2020.08); *G01C 21/387* (2020.08)

(58) Field of Classification Search
CPC ............ G01C 21/3885; G01C 21/3848; G01C 21/387; B60R 25/245
USPC .......................................................... 701/532
See application file for complete search history.

(56) References Cited

U.S. PATENT DOCUMENTS 9,916,755 B1 * 3/2018 Ratti .................... G08G 1/0112
10,604,114 B2 3/2020 Lin et al.
2020/0118373 A1 * 4/2020 Stitt ........................ G01S 11/02
2022/0139129 A1 5/2022 Lerner et al.

FOREIGN PATENT DOCUMENTS

JP 2018066207 A 4/2018
JP 2020195073 A 12/2020

OTHER PUBLICATIONS

Ren "The Security of Autonomous Driving Threats Defenses and Future Directions", vol. 108, No. 2, Feb. 2020, Proceedings of the IEEE. (Year: 2020).*
CrimeGrade Crime Maps and Statistics, CrimeGrade.org, 2023 (Year: 2023).*
Wawanesa, Prevent Car Theft_Avoid Parking in These 6 Areas, Wawanesa.com 2023 (Year: 2023).*
Ahmad et al., "Securing smart vehicles from relay attacks using machine learning", The Journal of Supercomputing (2020), vol. 76, No. 4, pp. 2665-2682.

* cited by examiner

*Primary Examiner* — Anshul Sood
*Assistant Examiner* — Shien Ming Chou
(74) *Attorney, Agent, or Firm* — DITTHAVONG, STEINER & MLOTKOWSKI

(57) ABSTRACT

An approach is provided for securing vehicles from relay attacks using map database. The approach, for example, involves determining a first location of a vehicle and a first location of a user associated with the vehicle. The approach further involves determining, using a map database, at least one signal dead zone within a first pre-determined distance from the first location of the vehicle. A distance between the first location of the user associated with the vehicle and the first location of the vehicle exceeds the first pre-determined distance. The approach further involves generating a validation output in response to the first location of the user associated with the vehicle exceeding the first pre-determined distance from the first location of the vehicle.

20 Claims, 12 Drawing Sheets

200

400

500A

500B

600

800

900

SYSTEM AND METHOD FOR SECURING VEHICLES FROM RELAY ATTACKS USING MAP DATABASE

BACKGROUND

In recent years, as automotive technology has evolved towards accelerated connectivity and convenience, the risk of vehicle theft and break-ins has escalated exponentially. One such method is called a "relay attack" which exploits wireless communication systems that are used in keyless entry and ignition systems of vehicles. The relay attack involves capturing and amplifying signals from a vehicle's key fob and tricking the vehicle into believing the key fob is nearby, and therefore, granting unauthorized entry into the vehicle. Another such method is called a "jamming attack" which saturates a vehicle key fob's operating frequency with noise, such that e.g., locking commands cannot be received by the vehicle.

Such relay attacks are concerning due to their relative ease of execution and the minimal requirement of technical knowledge. Nowadays, criminals equipped with inexpensive relay devices can effectively exploit vehicles keyless entry systems, resulting in substantial financial losses to vehicle proprietors as well as insurance vendors. Moreover, such relay attacks pose a significant challenge to the trust and adoption of the keyless entry technologies, which were initially designed to enhance convenience and streamline the user experience.

Therefore, there is a need for a system and a method to secure vehicles from such relay attacks.

SOME EXAMPLE EMBODIMENTS

According to one embodiment, a system for securing vehicles from relay attacks using a map database is provided. The system comprises a memory configured to store computer-executable instructions and one or more processors configured to execute the computer-executable instructions to determine a first location of a vehicle and a first location of a user associated with the vehicle. The system may be further configured to determine at least one signal dead zone within a first pre-determined distance from the first location of the vehicle using a map database. If a distance between the first location of the user associated with the vehicle and the first location of the vehicle exceeds the first pre-determined distance, the system may be further configured to generate a validation output in response.

According to another embodiment, a method for securing vehicles from relay attacks using a map database is provided. The method includes determining a first location of a vehicle and a first location of a user associated with the vehicle. The method further includes determining at least one signal dead zone within a first pre-determined distance from the first location of the vehicle using a map database. If a distance between the first location of the user associated with the vehicle and the first location of the vehicle exceeds the first pre-determined distance the method further includes generating a validation output in response to the distance between the first location of the user associated with the vehicle and the first location of the vehicle exceeding the first pre-determined distance.

According to another embodiment, a non-transitory computer-readable medium carries one or more sequences of one or more instructions which, when executed by one or more processors, cause, at least in part, an apparatus to perform operations. The operations include determining a first location of a vehicle and a first location of a user associated with the vehicle. The operations further include determining at least one signal dead zone within a first pre-determined distance from the first location of the vehicle using a map database. If a distance between the first location of the user associated with the vehicle and the first location of the vehicle exceeds the first pre-determined distance the operations may further includes generating a validation output in response to the distance between the first location of the user associated with the vehicle and the first location of the vehicle exceeding the first pre-determined distance.

In addition, for various example embodiments described herein, the following is applicable: a computer-programmable product may be provided. For example, a computer program product comprising instructions which, when executed by a computer, cause the computer to perform any one or any combination of methods, operations, or processes disclosed herein.

According to another embodiment, an apparatus comprises means for securing vehicles from relay attacks using a map database. The apparatus is configured to determine a first location of a vehicle and a first location of a user associated with the vehicle. The apparatus may be further configured to determine at least one signal dead zone within a first pre-determined distance from the first location of the vehicle using a map database. If a distance between the first location of the user associated with the vehicle and the first location of the vehicle exceeds the first pre-determined distance, the apparatus may be further configured to generate a validation output in response to the distance between the first location of the user associated with the vehicle and the first location of the vehicle exceeding the first pre-determined distance.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or the mobile device side, or in any shared way between a service provider and mobile device with actions being performed on both sides.

For various example embodiments, the following is applicable: An apparatus comprising means for performing a method of the claims.

Still, other aspects, features, and advantages of the invention are readily apparent from the following detailed description, simply by illustrating a number of particular embodiments and implementations, including the best mode contemplated for conducting the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a system, method, and computer program for securing vehicles from relay attacks using a map database are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
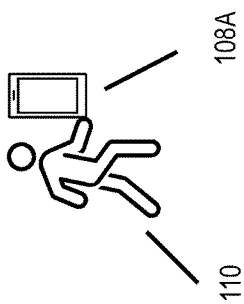
FIG. 1A is a diagram of a system capable of securing vehicles from relay attacks using a map database, according to one embodiment.
Figure 1A:
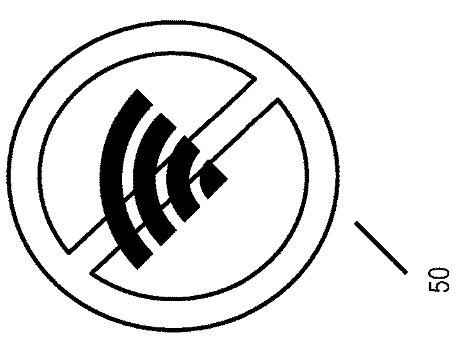
Figure 1A:
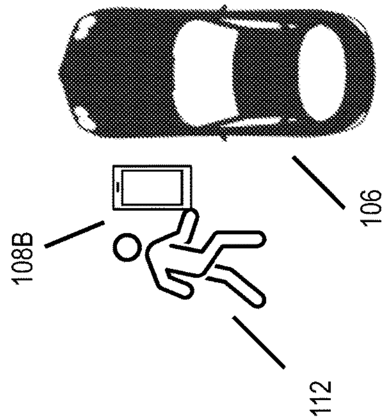

FIG. 1A is a diagram of a system 100 capable of securing vehicles from relay attacks, jamming attacks, etc. As shown in FIG. 1A the system 100 includes a vehicle 106, an authorized user 110, an unauthorized user 112, and a set of user equipments (UEs) 108 for each user (the authorized user 110 and the unauthorized user 112 respectively). The system 100 may help prevent relay attacks, jamming attacks, etc. by tracking the location of one or more signal dead zones 50. For example, the diagram shows a user 110 (for example an end user) that has walked away from their vehicle 106. As the end user travels away from their vehicle, the system 100, via e.g., the end user mobile device (for example the set of UEs 108), vehicle 106 sensors, etc. may track the location of the authorized user. The system 100 may also track and/or detect the location of one or more signal dead zones 50 which hamper or fully block radio signals in a given area (e.g., parking garage). As the end user moves away from the vehicle, past one or more known or newly discovered signal dead zones 50, the system may deduce that any vehicle unlock/access message transmitted to the vehicle 106 may be unauthorized, since the authorized user is blocked from communicating with their vehicle via key FOB, Wi-Fi, etc.

Thus, in this example as the unauthorized user 112 attempts to access the vehicle, the system 100 may block access to the vehicle, prompt the end user(s) to undergo secondary authentication, generate alerts, etc. Further details regarding the system 100 components and function may be found below.

Figure 1B:
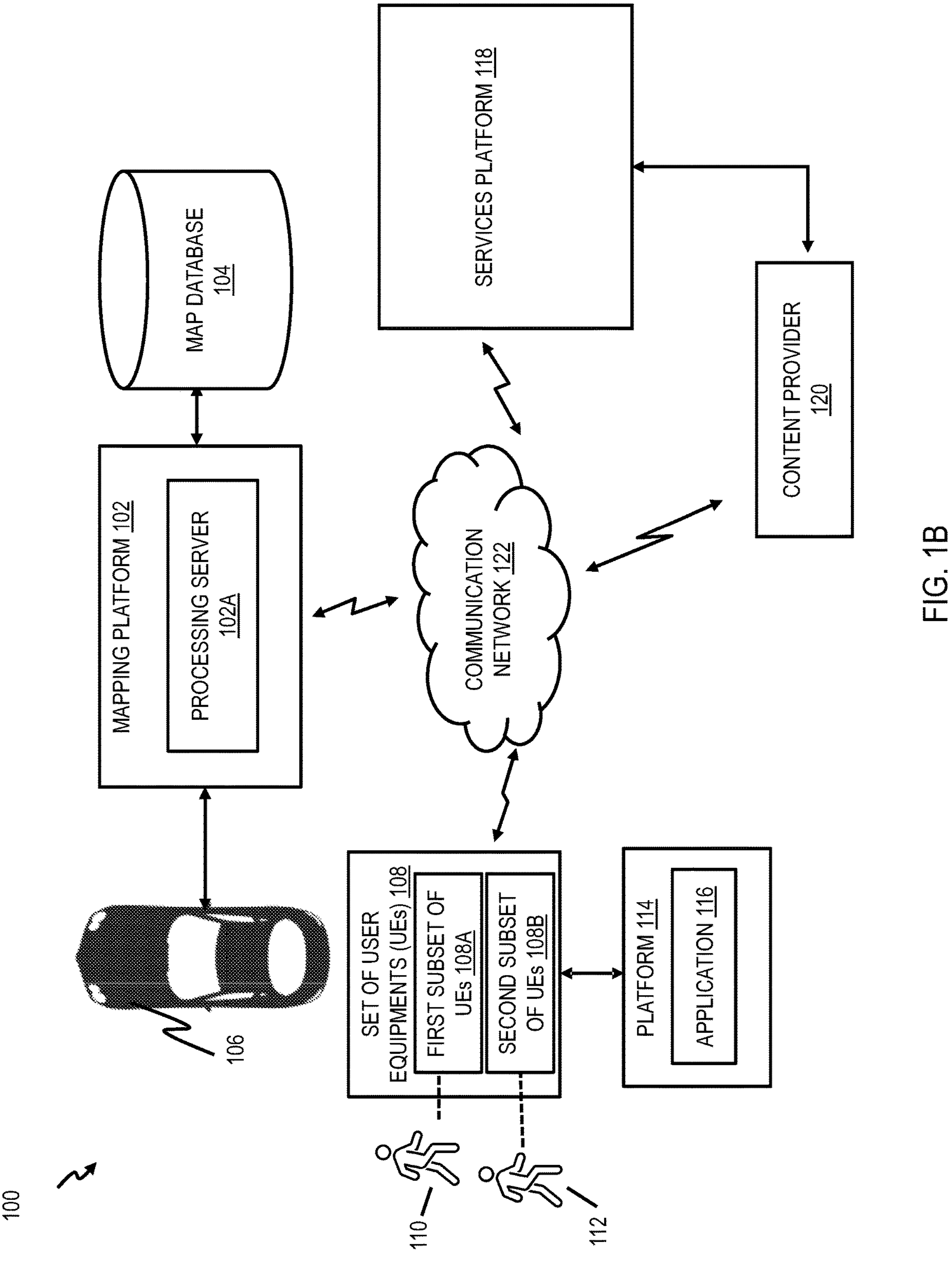
FIG. 1B is a diagram of a system capable of securing vehicles from relay attacks using a map database, according to another embodiment.

FIG. 1B is a diagram of a system 100 capable of securing vehicles from relay attacks, jamming attacks, etc. using a map database, according to another embodiment. The system 100 may include a mapping platform 102. The mapping platform 102 may include a processing server 102A and be connected to a map database 104. The mapping platform 102 may be associated with a map database 104 and a vehicle 106. The system 100 may further include the set of UEs 108, a user 110, an unauthorized user 112, a platform 114, an application 116, services platform 118, and content providers 120. The system 100 may further include a communication network 122.

The embodiments disclosed herein address the aforementioned problems relating to securing vehicles from relay attacks using the map database 104. While the vehicle 106 is parked at a geographical location, an unauthorized user 112 may be trying to steal the vehicle 106 using as a relay attack, jamming attack, etc. The relay attack in vehicles may involve exploiting vulnerabilities in keyless entry systems by intercepting and amplifying radio frequency signals between a vehicle's key fob and the vehicle 106 itself. The unauthorized users 112 may work in pairs, with one near the targeted vehicle 106 and the other near the owner's key fob. The unauthorized user 112 near the key fob may capture and relay the weak key fob signal to another user near the vehicle 106, tricking the vehicle 106 into believing the legitimate key fob is nearby. This may enable unauthorized access to the vehicle 106, allowing the doors to be unlocked, the engine to be started, etc.

The system 100 may be configured to reliably determine whether the received key signals are genuine or suspicious based on a variety of parameters. If the key signals are deemed to be genuine, then the vehicle 106 is unlocked, etc. Otherwise, if the key signals are deemed to be potentially unauthorized, the vehicle 106 may activate an auxiliary vehicle access mechanism, generate alerts, etc.

In operation, the vehicle 106 may be parked at the geographical location (a first location) and may obtain a vehicle access signal for controlling one or more vehicle operations of the vehicle 106 from at least one of the set of UEs 108. In an embodiment, the system 100 may be configured to obtain the vehicle access signal over a personal area network adapter (or PAN adapter) of the vehicle 106. The PAN adapter may be configured to communicate via signals complying to different frequency spectrum ranges, different encoding schemes, different communication protocols and the like, for example short-distance wireless network technologies such as IrDA, Wireless USB, Bluetooth or Zigbee, or a dedicated key fob/key card communication protocol. The vehicle access signal may be obtained from at least one UE associated with the user 110 or a UE associated with the unauthorized user 112.

Based on the obtainment of the vehicle access signal, the system 100 may be configured to determine a first location of the vehicle 106 and a first location of the user 110 associated with the vehicle 106. The system 100 may be further configured to determine at least one signal dead zone within a first pre-determined distance from the first location of the vehicle 106. In an embodiment, the at least one signal dead zone may be determined using the map database 104. In an embodiment, the system 100 may be configured to determine the at least one signal dead zone based on the map database data corresponding to the first location of the vehicle 106 and a signal dispersion model of a network signal at the first location of the vehicle 106. A signal dispersion model may be used to represent the signal strength decay in dependence of signal and environment parameters, for example in dependence of at least its frequency, a distance from the source, a transmission medium (e.g. air, water, wood, concrete, glass, etc.), physical objects (e.g. walls, furniture) or a combination thereof. By way of example, a value(s) representing a signal at a source (e.g. frequency in Hz, signal strength in dBm, etc.) and an environment value(s) (e.g. transmission media, dimensions of media, objects in space, etc.) may be entered into the model to obtain an output of an expected signal value at a location relative to the source. The signal dispersion model may correspond to one of a cellular data network signal, a wireless local area network signal, a satellite data network signal, a personal wireless network signal, or a combination thereof. Specifically, the map database 104 may include a radio map that includes information associated with signal strength of communication signals in a given area, floor of parking garage, etc. The radio map may also include signal strength at the determined first location of the vehicle 106 and the first location of the user 110. In an embodiment, the signal strength of the communication signals in the at least one signal dead zone may be less than a pre-determined signal strength threshold. The pre-determined signal strength threshold may correspond to a minimum value of the signal strength that may be required to establish communication between at least two devices (such as the vehicle 106 and the key fob of the vehicle 106). Details about the signal dead zone are provided, for example, in FIG. 3.

In an embodiment, a distance between the first location of the user 110 associated with the vehicle 106 and the first location of the vehicle 106 may exceed the first pre-determined distance. For example, the system 100 may determine that a signal dead zone is located between the user 110 and the vehicle 106 while the distance exceeds the pre-determined distance. With knowledge of the user 110 being at or farther beyond the pre-determined distance, and that a signal dead zone is present, the system 100 may now assume that any vehicle access signal coming from a location corresponding to the signal dead zone or beyond is to be considered suspicious, as it would not be possible for any of the first subset of UEs 108A to have emitted the signal. The system 100 may be further configured to generate a validation output in response thereto. For instance, if the vehicle access signal is received while the distance between the first location of the user 110 associated with the vehicle 106 and the first location of the vehicle 106 exceeds the first pre-determined distance, then the received vehicle access signal may be classified as a suspicious vehicle access signal e.g. received from the second subset of UEs (or an unauthorized set of UEs) 108B. Otherwise, the vehicle access signal may be classified as an unsuspicious vehicle access signal, e.g., received from the first subset of UEs 108A (or an authorized subset of UEs 108A) associated with the vehicle 106. Details about the classification of the vehicle access signal are provided, for example, in FIG. 3.

In case the obtained vehicle access signal is classified as suspicious, the system 100 may be configured to deactivate at least one vehicle operation and/or activate an auxiliary vehicle access mechanism. Details about the auxiliary vehicle access mechanism are provided, for example, in FIG. 3.

Figure 2:
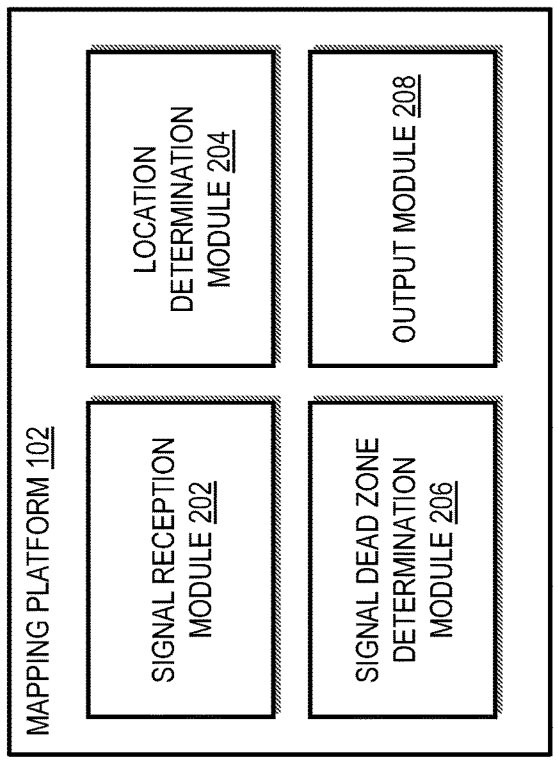
FIG. 2 is a diagram of components of the system capable of securing the vehicle from relay attacks using a map database, according to one embodiment.

The components of the mapping platform 102 for securing the vehicle 106 from relay attacks using the map database 104 are described in FIG. 2.

FIG. 2 is a diagram 200 of components of the system 100 capable of securing the vehicle 106 from relay attacks using the map database 104, according to one embodiment. It is contemplated that the functions of the components of the mapping platform 102 may be combined or performed by other components of equivalent functionality. As shown, in one embodiment, the mapping platform 102 includes a signal reception module 202, a location determination module 204, a signal dead zone determination module 206, and an output module 208. The above-presented modules and components of the mapping platform 102 can be implemented in hardware, firmware, software, or a combination thereof. Though depicted as a separate entity in FIG. 1B, it is contemplated that the mapping platform 102 may be implemented as a module of any of the components of the system 100 (e.g., a component of the services platform 118, the content providers 120, the set of UEs 108, the application 116, and/or the like). In another embodiment, one or more of the modules 202-208 may be implemented as a cloud-based service, local service, native application, or combination thereof. The functions of the mapping platform 102 and modules 202-208 are discussed with respect to the figures below.

Figure 3:
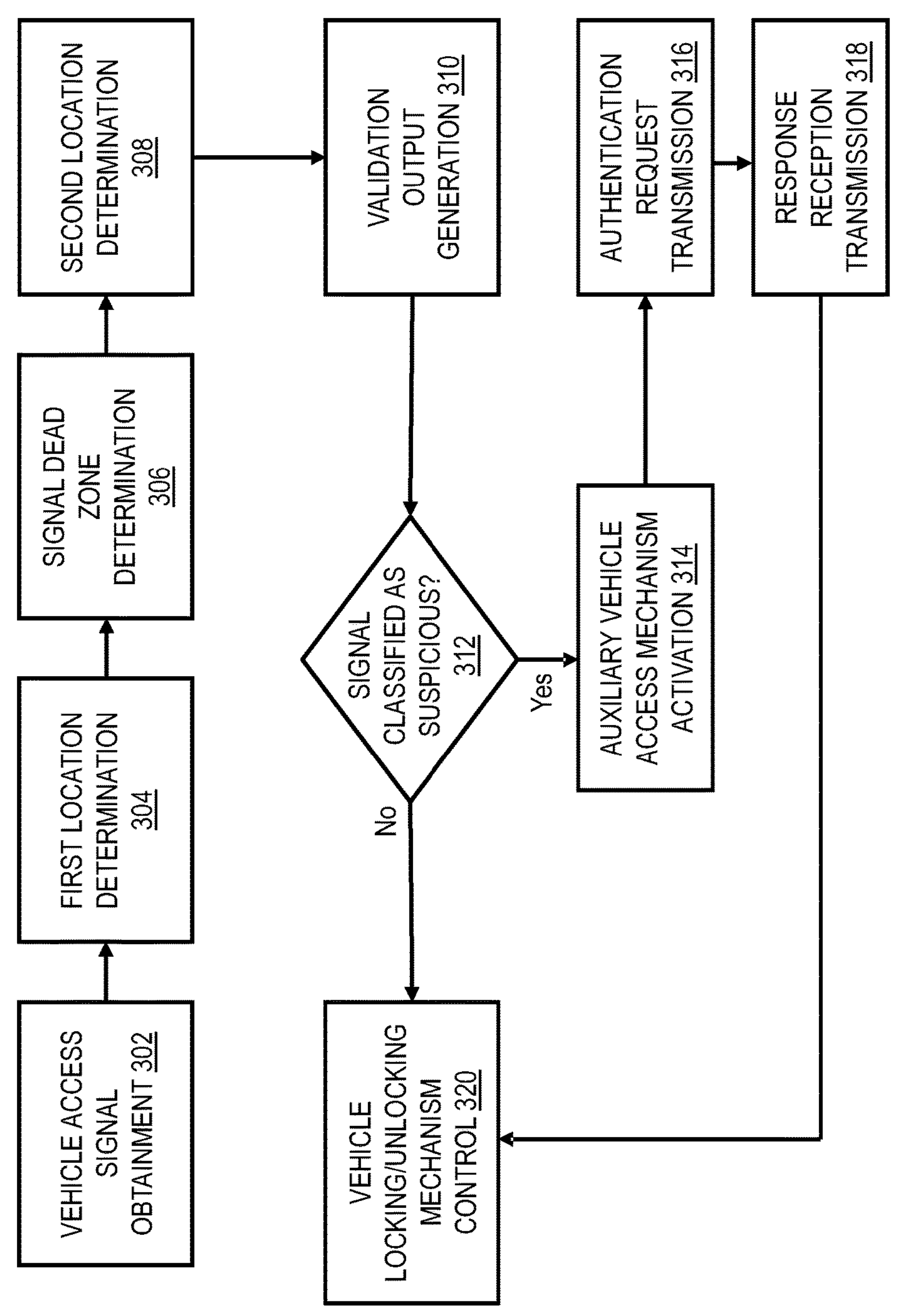
FIG. 3 is a diagram depicting steps for securing vehicles from relay attacks using a map database, according to one embodiment.
Figure 8:
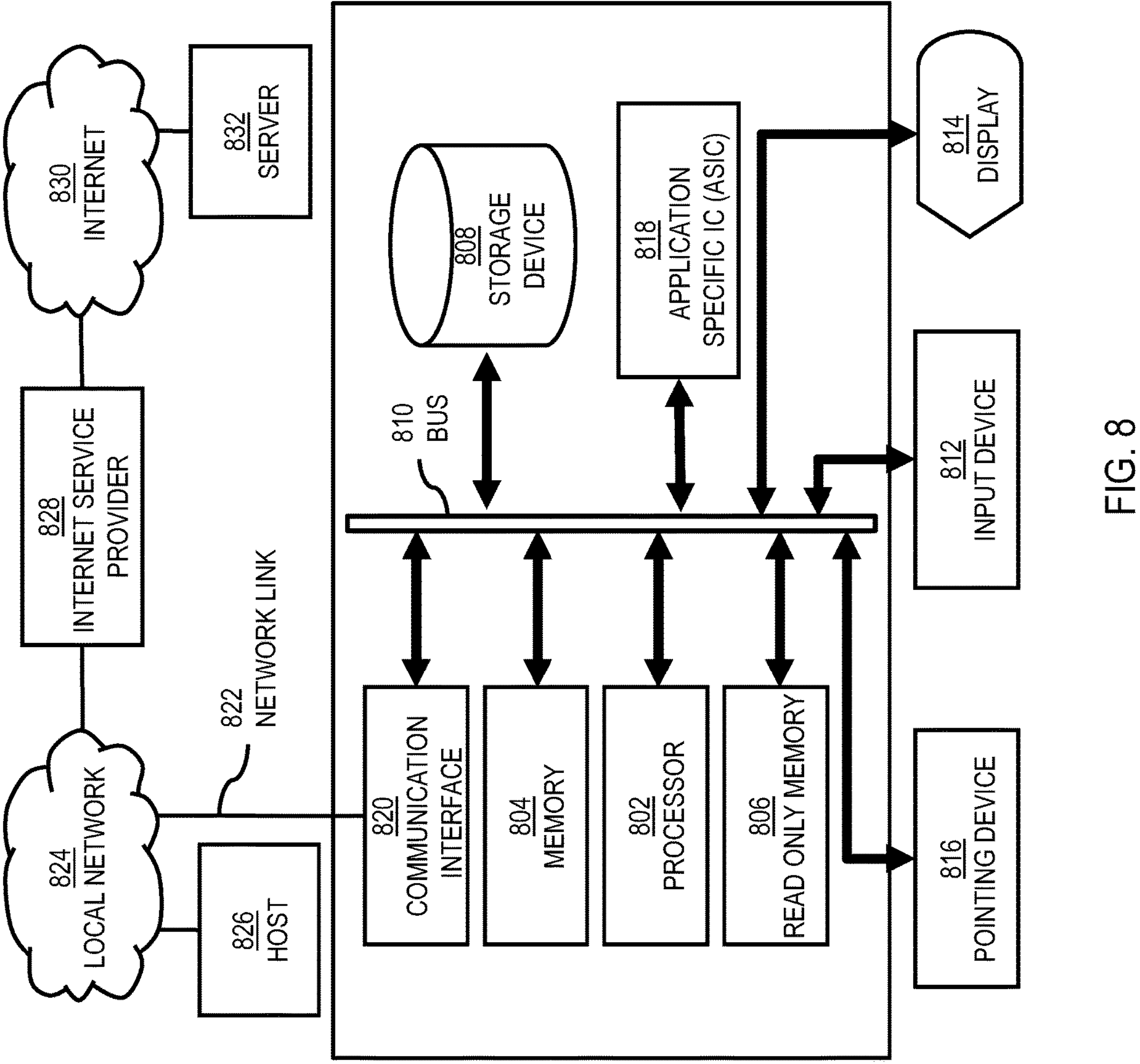
FIG. 8 is a diagram of hardware that can be used to implement an embodiment.
Figure 9:
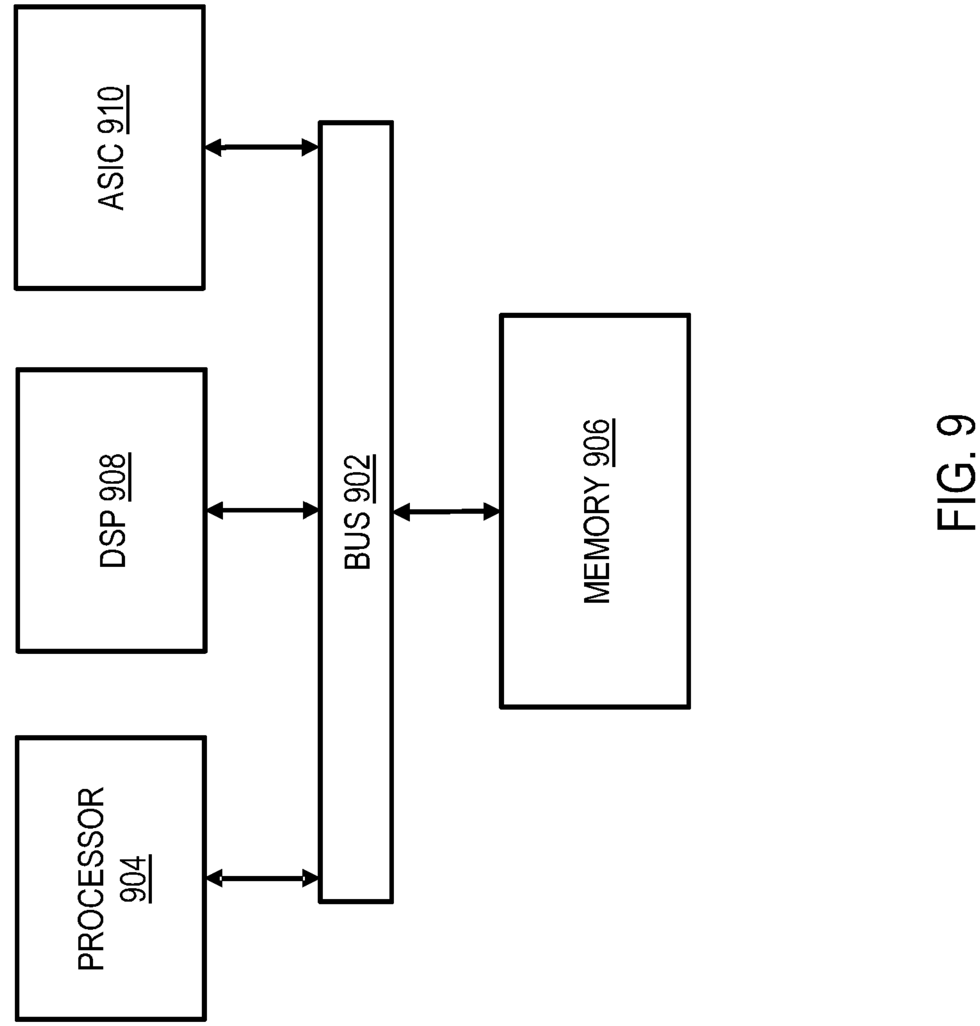
FIG. 9 is a diagram of a chip set that can be used to implement an embodiment.

FIG. 3 is a diagram 300 depicting steps for securing vehicles from relay attacks using the map database 104. In various embodiments, the mapping platform 102 and/or any of the modules 202-208 may perform one or more of the steps depicted in the diagram 300 and may be implemented in, for instance, a chip set including a processor and a memory as shown in FIG. 8 and FIG. 9. As such, the mapping platform 102 and/or any of the modules 202-208 may provide means for accomplishing various parts of the steps depicted in the diagram 300, as well as means for accomplishing embodiments of other processes described herein in conjunction with other components of the system 100. Although the diagram 300 is illustrated and described as a sequence of steps, it is contemplated that various embodiments of the method explained in the diagram 300 may be performed in any order or combination and need not include all the illustrated steps.

At step 302, a vehicle access signal may be obtained. In an embodiment, the system 100 may be configured to obtain the vehicle access signal to control one or more vehicle operations of the vehicle 106. The one or more vehicle operations may be associated with accessing the vehicle 106. Specifically, the one or more vehicle operations of the vehicle 106 may correspond to at least one of a locking control operation, or an ignition control operation associated with the vehicle 106. The locking control operation may correspond to locking or unlocking one or more doors of the vehicle 106 and the ignition control operation may correspond to staring/activating an engine of the vehicle 106.

In an embodiment, the vehicle access signal may be obtained over the PAN adapter of the vehicle 106. The PAN adapter of the vehicle 106 may allow the user 110 (or the an unauthorized user 112) to connect their UE of the set of UEs 108, such as a mobile device, a tablet, a key fob, or a key card, to the vehicle's network for entertainment, navigation, and control one or more vehicle operations may be associated with accessing the vehicle 106. The PAN adapter of the vehicle 106 may, among other functions, be able to determine a signal strength of an incoming signal, a signal travel time (one way and/or return), an incidence angle of a signal, or a combination thereof.

In an embodiment, the one or more signals may be received from at least one of the set of UEs 108. As discussed above, the set of UEs 108 may include the first subset of UEs 108A and the second subset of UEs 108B. The first subset of UEs 108A may be associated with the user 110 of the vehicle 106 whereas the second subset of UEs 108B may be associated with an unauthorized user 112. The first subset of UEs 108A may include, but are not limited to, a key fob, a key card, a wearable device, a computing device, a smartphone, a cellular phone, a mobile phone, a gaming device, a consumer electronic (CE) device, a mainframe machine, a server, and a computer workstation. The second subset of UEs 108B may include, but is not limited to, a signal relaying device, a signal cloning device, a signal interception device, a wireless sniffing device, a key fob, a wearable device, a computing device, a smartphone, a cellular phone, a mobile phone, a gaming device, a consumer electronic (CE) device, a mainframe machine, a server, or a computer workstation.

At step 304, a first location determination operation may be executed. In the first location determination operation, the system 100 may be configured to determine the first location of the vehicle 106 and the first location of the user 110 associated with the vehicle 106. The first location of the vehicle 106 may correspond to a current location of the vehicle 106 and the first location of the user 110 may correspond to the current location of the user 110 associated with the vehicle 106 at a given time.

In an embodiment, one or more location sensors may be installed in the vehicle 106. The system 100 may be configured to control the one or more location sensors to capture the first location information associated with the first location of the vehicle 106. The system 100 may be configured to receive the first location information of the vehicle 106 from the one or more location sensors and determine the first location of the vehicle 106 from the received first location information. In another embodiment, the system 100 may be configured to control one or more image sensors that may be installed on streets or inside/outside buildings to capture one or more images of the vehicle 106. Based on the captured one or more images, the system 100 may be configured to determine the first location of the vehicle 106.

In an embodiment, the system 100 may be configured to determine a first location of the user 110 associated with the vehicle 106 from one or more location sensors installed on at least one of the first subset of UEs 108A that may be associated with the user 110. In another embodiment, signals emitted by a UE of the first subset of UEs 108A may be received by the PAN adapter of the vehicle 106 and may be analyzed using e.g. triangulation techniques to obtain an estimated distance or an estimated location from which the signal is coming from, thus determining a first location of the user 110. In yet another embodiment, the determination of the first location of the user 110 associated with the vehicle 106 may include tracking the user 110 within a field of view of at least one sensor (for example a camera sensor) mounted on the vehicle 106. The camera sensor may use one or more facial recognition methods to track the user 110 and further determine the first location of the user 110. In some other embodiments, other sensors such as a light detection and ranging (LiDAR) sensor and a radio detection and ranging (RADAR) sensor may be used to track the user 110 and further determine the first location associated with the user. For example, the LiDAR and RADAR sensors may track a human shape signature in relation to the vehicle 106. In some other embodiments, the system 100 may be configured to control at least one sensor mounted around the first location of the vehicle 106 (such as street-facing cameras) to capture one or more images of the user 110. The system 100 may be further configured to determine the first location of the user 110 from the captured one or more images of the user 110. This tracking information may be combined with data (e.g., accelerometer data) from UEs 108 such as mobile devices, smart watches, etc. to further assist in determining an end user's location.

As discussed above, the system 100 may be able to track the user 110 using at least one of the first subset of UEs 108A. However, this approach may have a limitation that the at least one of the first subset of UEs 108A may need to be in communication with the vehicle 106. In the signal dead zone, the communication of the at least one of the first subset of UEs 108A with the vehicle 106 may be difficult or impossible. In such a scenario, the system 100 may obtain location data of the first subset of UEs 108A after the user 110 after the connection between the system 100 and the at least one of the first subset of UEs 108A is re-established. Such information may also be used to refine an extent of the signal dead zone.

At step 306, a signal dead zone determination operation may be executed. In the signal dead zone determination operation, the system 100 may be configured to determine at least one signal dead zone within a first pre-determined distance from the first location of the vehicle 106. The first pre-determined distance may be a numerical value in appropriate units (meters, yards, feet, and the like) and may correspond to a maximum distance between the vehicle 106 and the first subset of UEs 108A to establish the communication between the vehicle 106 and the first subset of UEs 108A. By way of example, if the vehicle 106 and the first subset of UEs 108A communicate using Bluetooth® protocol, then the pre-determined distance threshold may correspond to a maximum range of a Bluetooth® connection. As another example, a key fob corresponding to the vehicle 106 may have a known/pre-determined transmission range, so that the pre-determined distance threshold corresponds to the transmission range.

In the signal dead zone, a signal strength of communication signals may be less than a pre-determined signal strength threshold. A signal dead zone may be specific to a frequency range, e.g., the frequency range of Wi-Fi, Bluetooth, 5G data networks, or the like. The pre-determined signal strength threshold may correspond to a minimum value of the signal strength that is required to establish a communication between at least two devices.

In one embodiment, the system 100 may be configured to determine the at least one signal dead zone based on signal dead zone records corresponding to the first location of the vehicle 106 obtained from the map database 104. The signal dead zone may be located within a distance and a direction relative to the first location of the vehicle 106. As an example, the signal dead zone may be described by a polygon adjacent or encompassing the vehicle 106. It should be noted that it is not necessary that the vehicle 106 is located at the center of the polygon, and that more than one signal dead zones may be determined to be adjacent or encompassing the vehicle.

In another embodiment, the system 100 may be configured to determine at least one signal dead zone based on the map database data corresponding to the first location of the vehicle 106 and a signal dispersion model of a network signal at the first location of the vehicle 106. As discussed above, the signal dispersion model of the network signal may represent a signal strength decay in dependence of signal and environment properties. The signal dispersion model may be used to identify areas of high and low signal strength and may be associated with one of a cellular data network signal, a wireless local area network signal, a satellite data network signal, a personal wireless network signal, or a combination thereof. In an embodiment, the personal wireless network signal may correspond to at least one of a key fob, a key card, or a mobile device associated with the vehicle 106. The system 100 may be configured to transmit a representation of the at least one signal dead zone to a location services provider, wherein the representation of the at least one signal dead zone is associated with the first location of the vehicle. For example, the signal dead zone may be represented as a GeoJSON polygon, referencing the location where it was determined to exist e.g., relative to the location of the vehicle 106. If such signal dead zones are determined at the vehicle 106, these may be uploaded via the location services provider or the mapping platform 102 to update the map database 104. Multiple vehicles performing such determinations and updates may effectively crowd-source signal dead zone information at multiple locations.

In an embodiment, the system 100 may be configured to determine at least one signal dead zone within a first pre-determined distance from the first location of the vehicle 106 using the map database 104. As discussed above, the map database 104 may include the radio maps. The radio maps may be visual representations of radio frequency signals in a particular area. The radio maps may be used to analyze and optimize radio coverage for wireless communication networks. Also, the radio map may provide information associated with signal strength, interference, and coverage gaps in the corresponding area. Radio maps may further be frequency-specific, for example specific to key fob frequencies, Bluetooth frequencies, Wi-Fi frequencies, Cell Data frequencies or the like.

In an embodiment, the system 100 may be configured to retrieve the information associated with signal strength at the first location of the vehicle 106 (and/or the first location of the user 110) from the radio maps stored in the map database 104 and determine the presence of the at least one signal dead zone within the first pre-determined distance of at least one of the first location of the vehicle 106 (and/or the first location of the user 110), or between the first location of the vehicle 106 and the first location of the user 110, or a combination thereof. Specifically, the system 100 may be configured to retrieve from the map database 104, the signal dispersion model corresponding to the location of the vehicle 106. Using the signal dispersion model, the system 100 may establish the pre-determined signal strength threshold(s) in relation to the distance between the first location of the vehicle 106 and the first location of the user 110. The system 100 may be further configured to extract the first signal strength of the first subset of UEs 108A at the first location of the vehicle 106 and the second signal strength of the first subset of UEs 108A at the first location of the user 110. The system 100 may be further configured to compare the extracted first signal strength and the extracted second signal strength with the pre-determined signal strength threshold. Based on the comparison resulting in a second signal strength lower than the pre-determined signal strength threshold while one of the set of UEs 108 is determined to be within the first pre-determined distance of the vehicle 106, the presence of at least one signal dead zone may be established.

At 308, a second location determination operation may be executed. In the second location determination operation, the system 100 may be configured to determine a second location associated with the obtained vehicle access signal. Specifically, the system 100 may be configured to determine the second location of at least one user equipment of the set of UEs 108 from which the vehicle access signal may be obtained. As mentioned before, the PAN adapter of the vehicle 106 may, among other functions, be able to determine a signal strength of an incoming signal, a signal travel time (one way and/or return), an incidence angle of a signal, or a combination thereof. By analyzing the received signals using e.g., triangulation techniques, an estimated distance or an estimated location from which the signal of the at least UE of the set of UEs 108 is coming from may be calculated. In an embodiment, the vehicle access signal may be obtained from at least one of the first subset of UEs 108A associated with the user 110 of the vehicle 106. In an alternate embodiment, the vehicle access signal may be received from at least one of the second subset of UEs 108B associated with the unauthorized user 112. The system 100 may be configured to determine the second location of at least one device from the first subset of UEs 108A or the second subset of UEs 108B.

At 310, a validation output may be generated. In an embodiment, the system 100 may be configured to generate a validation output in response to the distance between the first location of the user 110 and the first location of the vehicle 106 exceeding the first pre-determined distance and a signal dead zone being located between the user 110 and the vehicle 106. The validation output may include information that may indicate whether the obtained vehicle access signal is genuine or suspicious. To generate the validation output, the system 100 may be configured to classify the obtained vehicle access signal into either the genuine authorized signal or potentially unauthorized suspicious signal.

In case the vehicle access signal is obtained from the first subset of UEs 108A and the first location of the user 110 is within the first pre-determined distance from the first location of the vehicle 106, then the obtained vehicle signal may be deemed as a genuine signal. In any other case, the obtained vehicle access signal may be deemed as a suspicious signal. As an example, if the vehicle access signal is obtained from the first subset of UEs 108A and the distance between the first location of the user 110 and the first location of the vehicle 106 exceeds the first pre-determined distance while a signal dead zone is located between the user 110 and the vehicle 106, then the obtained vehicle signal may be deemed as a suspicious signal.

In an embodiment, the first pre-determined distance, as mentioned before, may be dependent on the location of signal dead zones relative to the vehicle. For example, consider a user 110 walking 100 m from their car while a signal dead zone is located 50 m south of their car, hence yielding a pre-determined distance of 50 m southbound. For this example, a maximum signal range of one of the first subset of UEs 108A is 120 m, yielding a maximum pre-determined distance of 120 m in other directions. If the user 110 walked 100 m south, the signal emitted from the one IE of the first subset of UEs 108A should be blocked by the dead zone. However, if the user 110 walked 100 m north, then the signal may still be considered genuine as there is no signal dead zone between the vehicle 106 and the user 110, but the user is still within 120 m of the vehicle. In cases where signals are obtained from distances beyond the pre-determined distance (whether determined by signal dead zones or maximum signal range), the signals may be classified as suspicious.

At 312, it may be determined whether the obtained vehicle access signal is classified as a potentially unauthorized signal or not. If the obtained vehicle access signal is classified as potentially unauthorized, the vehicle access control may be transferred to an auxiliary vehicle access mechanism (see 314) and, optionally, access based on vehicle access signals may be disabled. Otherwise, the vehicle access control may be transferred to 320.

At 314, an auxiliary vehicle access mechanism activation operation may be executed. In the auxiliary vehicle access mechanism activation operation, the system 100 may be configured to activate an auxiliary vehicle access mechanism of the vehicle 106 based on the classification of the obtained vehicle access signal as potentially unauthorized. In an embodiment, the auxiliary vehicle access mechanism may correspond to a secondary authentication (also referred to as a multi-factor authentication or a two-factor authentication). The activation of the auxiliary vehicle access mechanism may correspond to the activation of the secondary authentication for controlling the one or more vehicle operations of vehicle 106. The auxiliary vehicle access mechanism may be an additional security measure that may require the user 110 to provide a secondary authentication method such as a fingerprint scan or a unique code sent to their mobile device to access the vehicle 106. In an embodiment, a keypad may be used to enter a unique code to access the vehicle 106. In another embodiment a fingerprint scanner, facial recognition, etc. may be utilized by the system 100 to provide authorized access when a potentially unauthorized access signal is detected. These various forms of auxiliary access may be carried out by a given vehicle 106, end user device (any UE of the set of UEs 108), etc.

At 316, an authentication request transmission operation may be executed. In the authentication request transmission operation, the system 100 may be configured to transmit the authentication request to at least one of the first subset of UEs 108A. Specifically, after the activation of the auxiliary vehicle access mechanism, the system 100 may be configured to transmit an authentication request to at least one of the first subset of UEs 108A. In general, the authentication request may correspond to a process wherein the system 100 may transmit an authentication request for proof of identity from the user 110 in order to verify their legitimacy. This may often involve the user 110 providing certain credentials, such as a password, a biometric scan, or a one-time password (OTP), or a unique code. Thus, the authentication request may serve as an important step in ensuring the security and authenticity of the identity of the user 110 before access to the vehicle 106 is granted.

At 318, a response reception operation may be executed. In the response reception operation, the system 100 may be configured to receive a user response. Specifically, the system 100 may be further configured to receive a user response from at least one of the first subset of UEs 108A. The user response may be received based on the transmitted authentication request and may be associated with the received one or more signals. The system 100 may be further configured to control the one or more vehicle operations of the vehicle 106 based on received user response. In case the authentication request is approved by the user 110, the system 100 may be configured to unlock the one or more doors of the vehicle 106 whereas if the authentication request is approved by the user 110, the system 100 may be configured to unlock the one or more doors of the vehicle 106. In case the authentication request is not approved by the user, the system 100 may be configured to deactivate remote vehicle unlocking operations associated with the vehicle 106. In case the remote vehicle unlocking operations are deactivated, the vehicle 106 may be unlocked using a physical key. In another embodiment, the system 100 may be configured to trigger an alarm in case the authentication request is not approved by the user 110. To trigger the alarm, the system 100 may be configured to control one or more audio rendering devices to output an audio in case the authentication request is not approved by the user 110.

At 320, a vehicle locking/unlocking mechanism control operation may be executed. In the vehicle locking/unlocking mechanism control operation, the system 100 may be configured to control the locking operation of the vehicle 106. The locking operation of the vehicle 106 may involve securing the one or more doors of the vehicle 106 to prevent any unauthorized entry into the vehicle 106. In case the signal is classified as suspicious at 310 or in case the authentication request is not approved by the user 110 at 316, the vehicle locking mechanism control operation may correspond to deactivating the remote vehicle unlocking operations associated with the vehicle 106. Based on pre-determined settings, the first location of the vehicle 106 may be transmitted in alerts generated by the system. In another embodiment, the system 100 may be configured to recommend one or more safe zones to the user 110 for parking the vehicle 106 as discussed in FIG. 4.

Figure 4:
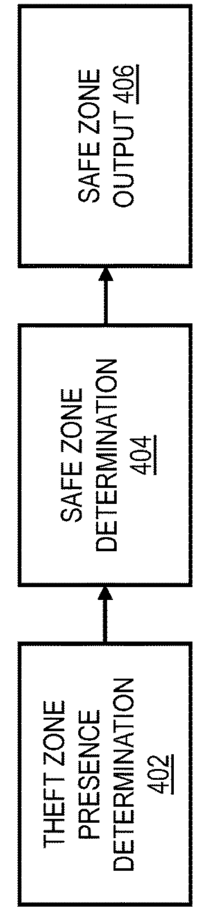
FIG. 4 is a diagram depicting steps for recommending safe zones for parking vehicles using a map database, according to one embodiment.

FIG. 4 is a diagram 400 depicting steps for recommending zones for parking vehicles using a map database, according to one embodiment. In various embodiments, the mapping platform 102 and/or any of the modules 202-208 may perform one or more of the steps depicted in the diagram 400 and may be implemented in, for instance, a chip set including a processor and a memory as shown in FIG. 8 and FIG. 9. As such, the mapping platform 102 and/or any of the modules 202-208 may provide means for accomplishing various parts of the steps depicted in the diagram 400, as well as means for accomplishing embodiments of other processes described herein in conjunction with other components of the system 100. Although the diagram 400 is illustrated and described as a sequence of steps, it is contemplated that various embodiments of the method explained in the diagram 400 may be performed in any order or combination and need not include all the illustrated steps.

At step 402, a high risk parking zone presence may be determined. In an embodiment, the system 100 may be configured to determine a presence of a high risk parking zone for parking the vehicle 106. In an embodiment, the map database 104 may include information on the high risk parking zones. The high risk parking zone may correspond to a map area of a specific dimension where a count of vehicle incidents, in a pre-specified time period (e.g., 3 months) may be greater than a pre-determined vehicle incident count threshold. By way of example and not limitation, if the count of theft, break-in, etc. incidents in the map area in the last 3 months is greater than 20, then the corresponding map area may be deemed as a high risk parking zone. In an embodiment, vehicle incidents may also be associated with relay attacks, vehicle break-ins, which may be received from one or more data sources. The one or more data sources may include at least one of a set of user devices associated with a set of users, a server, and a set of user feedback. The one or more data sources may further include information on historical data including reported theft incidents, insurance claims, car break-ins, relay attacks, jamming attacks, etc. within a given area. In another embodiment, reports (e.g. from vehicles 106) of newly detected signal dead zones at unexpected locations (e.g. where a signal dispersion model would not estimate a signal dead zone to be likely) may be perceived as indications of areas where jamming attacks are taking place, resulting in a parking zone being labeled as a high risk parking zone.

At 404, a lower risk parking zone may be determined. In an embodiment, the system 100 may be configured to determine at least one lower risk parking for parking the vehicle 106. The system 100 may be configured to recommend the user 110 to park the vehicle 106 in the lower risk zone. The determined at least one lower risk zone may be near the location of the vehicle 106 (e.g., within 500 feet, 2 blocks, etc.). A lower risk parking zone may, for instance, be associated signal dead zone information recorded in the map database 104. Further, new/updated signal dead zones detected/uploaded by other vehicles 106 may be associated with a lower risk parking zone. In the determined at least one safe zone, the count of theft incidents, insurance claims, car break-ins, etc. may also be less than the pre-determined threshold.

At step 406, the determined at least one lower risk zone may be provided by the system as a digital output, for example, a recommended parking location in a lower risk parking zone via an indication on a map displayed on a UI interface, as route guidance from the current vehicle location to the lower risk parking zone, an audible identification of the lower risk parking zone, or the like.

Figure 5A:
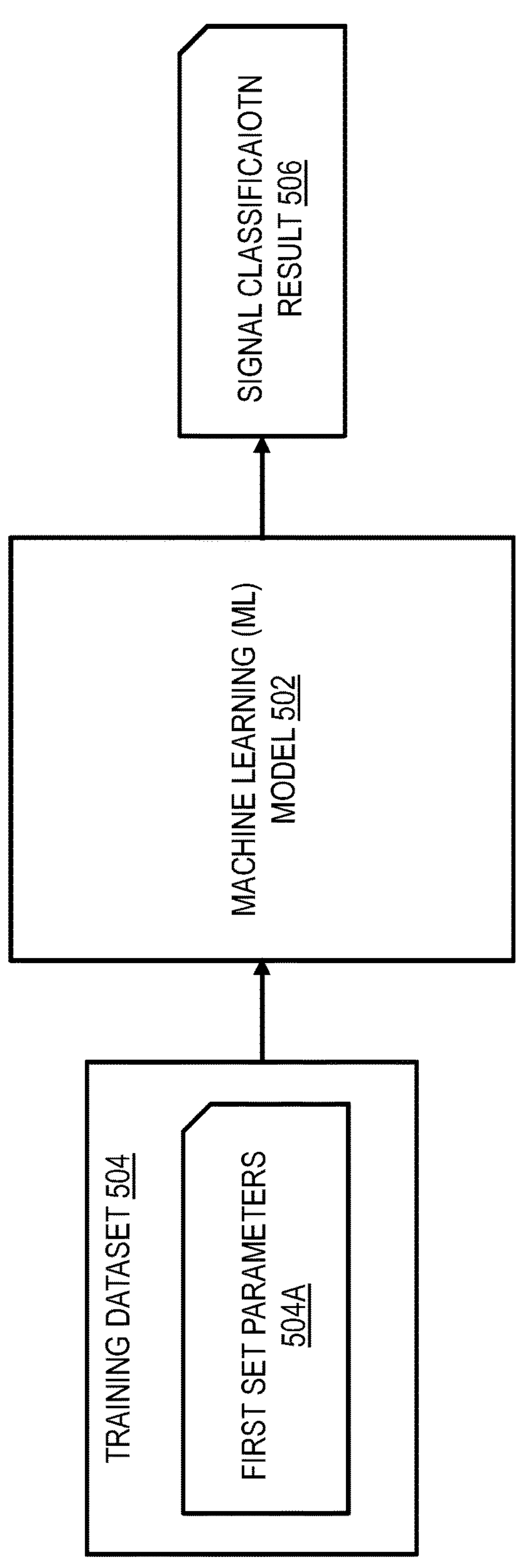
FIG. 5A is a diagram depicting training of a machine learning (ML) model for classification of the vehicle access signal, according to one embodiment.

FIG. 5A is a diagram 500A depicting training of a machine learning (ML) model 502 for classification of vehicle access signals, according to one embodiment. The diagram 500 may include the ML model 502, a training dataset 504, and a signal classification result 506. The training dataset 504 may include a first set of parameters 504A.

In some embodiments, the first set of parameters 502A may be associated with the user 110 associated with the vehicle 106 and may be authorized to use the vehicle 106. In another embodiment, the first set of parameters 502A may be associated with a set of vehicle access signals received from at least one UE of the set of UEs 108. The set of vehicle access signals may be received for controlling the one or more vehicle operations of the vehicle 106. In an embodiment, the system 100 may be configured to determine the first set of parameters associated with the set of vehicle access signals over a time-period (e.g., during the last 10 months).

In an embodiment, the first set of parameters may be associated with a usage pattern of at least one of the key fobs, the key card, or a mobile device associated with the vehicle 106, and a behavioral pattern of the user 110 (also referred as a vehicle access signal usage profile). The first set of parameters may include a frequency of the set of vehicle access signals received from at least one of the set of UEs 108, a distance between the vehicle and at least one UE of the set of UEs 108, and an identifier of at least one UE of the set of UEs 108.

In an embodiment, the system 100 may record and store keyless entry data to help identify unauthorized vehicle access attempts. The system 100 may further utilize signal dead zone information of signal dead zones adjacent to or encompassing the vehicle 106, in order to analyze an impact of such signal dead zones on the vehicle access signals. As a first example, the system 100 may determine that every time the user 110 is between 5-10 meters from the vehicle 106, the user 110 usually presses unlock twice on their key fob. Similar use patterns can be analyzed while a signal dead zone is present/not present. The system 100 may further save such information associated with the behavior of the user 110 and further train the ML model 502 using such information. The identifier of at least one of the UE of the set of UEs 108 may be associated with a unique identifier (such as a serial number or a media access control (MAC) address associated with the least one of the first subset of UEs 108A.

In some embodiments, the system 100 may be configured to train the ML model 502 to classify each obtained vehicle access signal as either an authorized or unauthorized signal. The ML model 502 may be, for example, a classification model that may be trained to classify each obtained vehicle access signal as either authorized or unauthorized. In this example, the one or more signals may be classified as an authorized signal, if the one or more signals are received from a UE 108 at a location of the user 110 is within a pre-determined distance from the first location of the vehicle 106. Otherwise, the one or more signals may be classified unauthorized and/or requiring further authentication.

The system 100 may provide, as a training input, the training dataset 504 to the ML model 502. The mapping platform 102 may further receive, as a training output, the signal classification result 506 for each of the obtained vehicle access signals. The ML model 502 may be trained until an error rate associated with the training output is less than a threshold. For example, the training output may be compared with the corresponding first label (i.e., authorized signal) or a second label (i.e., unauthorized signal). Once the training is completed, the trained ML model 502 may be stored in memory for usage as described in FIG. 5B.

Figure 5B:
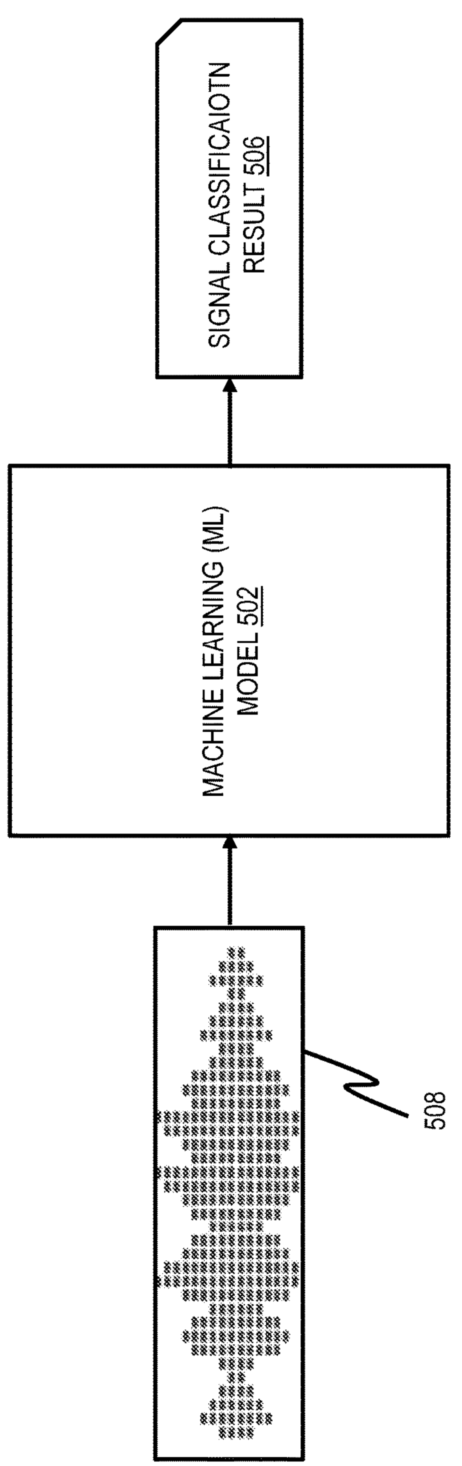
FIG. 5B is a diagram depicting the application of the ML model of FIG. 5A, according to one embodiment.

FIG. 5B is a diagram 500B depicting the application of the ML model 502 of FIG. 5A, according to one embodiment. The diagram 500B may include the trained ML model 502, the received a vehicle access signal 508, and the signal classification result 506.

In an embodiment, the system 100 may obtain the vehicle access signal 508 to control one or more vehicle operations of the vehicle 106 from at least one UE of the set of UEs 108. The system 100 may then examine other vehicle access signals obtained by the system. As the ML model 502 is trained on the usage pattern and the behavioral pattern of the user 110, the ML model 502 may be configured to determine whether the usage pattern and the behavioral pattern (or the vehicle access signal usage profile, etc.) of the user 110 is similar with respect to the additional vehicle access signal(s) and their associated parameters. Further, determining the characteristics of the vehicle access signals may utilize information of signal dead zones adjacent to or encompassing the vehicle 106. If the pattern is similar (e.g., within certain thresholds), the additional obtained vehicle access signal may be classified as an authorized signal. Alternatively, for example, if the one or more signals are obtained from user equipment that is one meter away from the vehicle 106 and the number of unlock signals is higher than the established routine amount generated by a given end user (e.g., five unlock signals sent in quick succession), such a vehicle access signal may be flagged as an unauthorized signal.

Figure 6:
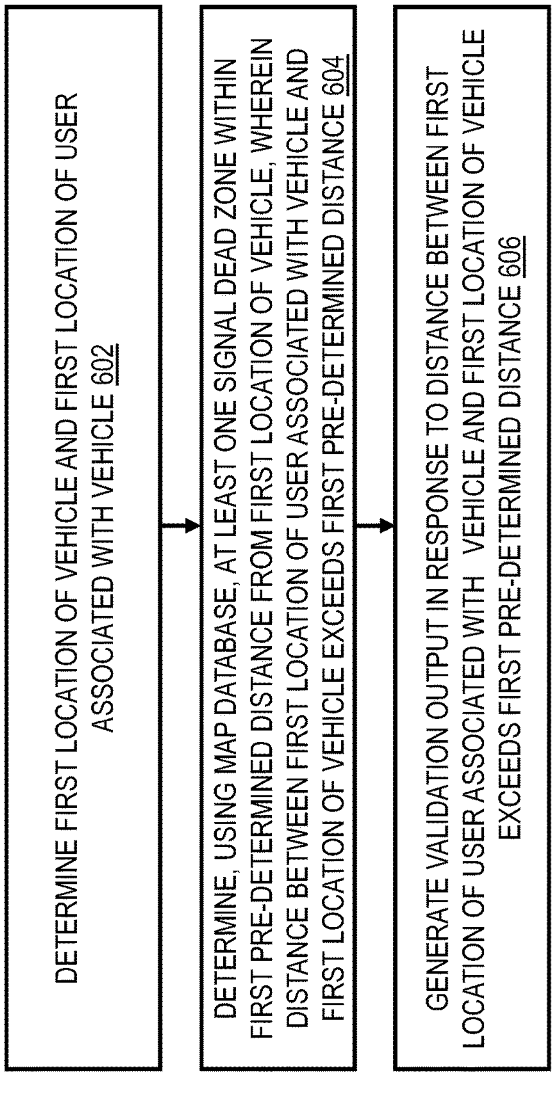
FIG. 6 is a flowchart of a method for securing vehicles from relay attacks using a map database, according to one embodiment.

FIG. 6 is a flowchart of a method 600 for securing vehicles from relay attacks using a map database, according to one embodiment. In various embodiments, the mapping platform 102 and/or any of the modules 202-208 may perform one or more portions of the method 600 and may be implemented in, for instance, a chip set including a processor and a memory as shown in FIG. 8 and FIG. 9. As such, the mapping platform 102 and/or any of the modules 202-208 may provide means for accomplishing various parts of the method 600, as well as means for accomplishing embodiments of other processes described herein in conjunction with other components of the system 100. Although the method 600 is illustrated and described as a sequence of steps, it is contemplated that various embodiments of the method 600 may be performed in any order or combination and need not include all of the illustrated steps.

At step 602, the first location of the vehicle 106 and the first location of the user 110 may be received. In some embodiments, the location determination module 204 may be configured to determine the first location of the vehicle 106 and the first location of the user 110 associated with the vehicle 106. Details about the determination of the first location of the vehicle 106 and the first location of the user 110 are further provided, for example, in FIG. 3.

At step 604, at least one signal dead zone may be determined. In some embodiments, the signal dead zone determination module 206 may be configured to determine, using the map database 104, at least one signal dead zone within the first pre-determined distance from the first location of the vehicle 106. A distance between the first location of the user 110 associated with the vehicle 106 and the first location of the vehicle 106 may exceed the first pre-determined distance. Details of determination of the at least one signal dead zone are further provided, for example, in FIG. 3.

At step 606, the validation output may be generated. In some embodiments, the output module 208 may be configured to generate the validation output in response to the distance between the first location of the user 110 and the first location of the vehicle 106 exceeding the first pre-determined distance. Details of the generated validation output are further provided, for example, in FIG. 3.

Returning to FIG. 1B, as shown, the system 100 includes the mapping platform 102 for securing vehicles from unauthorized access.

In one embodiment, the mapping platform 102 has connectivity over the communication network 122 to the services platform 118 that provides the one or more services. By way of example, the services may be third party services and include but are not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services may use the output of the mapping platform 102 to help users in securing their vehicles and provide other services such as navigation, mapping, other location-based services, etc. to the set of UEs 108, the application 116, and/or other client devices. In one embodiment, the service platform 118 may act as a content provider, analogously to content provider 120, providing the location data to the mapping platform 102.

In one embodiment, the mapping platform 102 may be a platform with multiple interconnected components. The mapping platform 102 may include multiple servers, intelligent networking devices, computing devices, components, and corresponding software for processing of data according to the various embodiments described herein. In addition, it is noted that the mapping platform 102 may be a separate entity of the system 100, or a part of the services platform 118 and/or its various services.

In one embodiment, the content providers 120 may provide content or data to the map database 104, the mapping platform 102, and the services platform 118. The content provided may be any type of content, such as location data, other contextual data (such as weather data, calendar data, event data, transport schedules), sensor data, imagery, probe data, machine learning models, permutations matrices, map embeddings, map content, textual content, video content, image content, etc. In one embodiment, the content providers 120 may provide content that may aid in processing of the location data, the other contextual data, etc. according to the various embodiments described herein. In one embodiment, the content providers 120 may also store content associated with the map database 104, the mapping platform 102, the services platform 118, and/or any other component of the system 100. In another embodiment, the content providers 120 may manage access to a central repository of data, and offer a consistent, standard interface to data, such as a repository of the map database 104.

The system 100 may include suitable logic, circuitry, interfaces, and/or code that may be configured to secure the vehicle 106 from one or more relay attacks. Specifically, the system 100 may be configured to secure the vehicle 106 from the one or more relay attacks, jamming attacks, etc. using the map database 104. Examples of the system 100 may include, but are not limited to, an electronic control unit (ECU), an electronic control module (ECM), a computing device, a mainframe machine, a server, a computer workstation, any and/or any other device with safety distance determination operations.

In an example embodiment, the system 100 may be onboard the vehicle 106, such as the system 100 may be a security system installed in the subject vehicle 106 for securing the vehicle 106. In another example embodiment, the system 100 may be the processing server 102A of the mapping platform 102 and therefore may be co-located with or within the mapping platform 102.

In another embodiment, the system 100 may be embodied as a cloud-based service, a cloud-based application, a cloud-based platform, a remote server-based service, a remote server-based application, a remote server-based platform, or a virtual computing system. In yet another example embodiment, the system 100 may be an OEM (Original Equipment Manufacturer) cloud. The OEM cloud may be configured to anonymize any data received by the system 100.

The vehicle 106 may be a non-autonomous vehicle, a semi-autonomous vehicle, or a fully autonomous vehicle, for example, as defined by National Highway Traffic Safety Administration (NHTSA). Examples of the vehicle 106 may include, but are not limited to, a two-wheeler vehicle, a three-wheeler vehicle, a four-wheeler vehicle, more than four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 106 may be a system through which an occupant (for example a rider) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell-based car, a solar powered-car, or a hybrid car. It may be noted here that the four-wheeler diagram of the vehicle 106 are merely shown as examples in FIG. 1A and FIG. 1B. The present disclosure may also be applicable to other structures, designs, or shapes of the vehicle 106. The description of other types of the vehicle and respective structures, designs, or shapes has been omitted from the disclosure for the sake of brevity.

In some example embodiments, the vehicle 106 may include processing means such as a central processing unit (CPU), storage means such as on-board read-only memory (ROM), and random access memory (RAM), acoustic sensors such as a microphone array, position sensors such as a global positioning system (GPS) sensor, gyroscope, a light detection and ranging (LiDAR) sensor, a proximity sensor, motion sensors such as an accelerometer, an image sensor such as a camera, a display enabled user interface such as a touch screen display, and other components as may be required for specific functionalities of the vehicle 106. In some example embodiments, user equipment may be associated, coupled, or otherwise integrated with the vehicle 106, such as an advanced driver assistance system (ADAS), a personal navigation device (PND), a portable navigation device, and/or other devices that may be configured to provide route guidance and navigation-related functions to the user.

In some example embodiments, the vehicle 106 may generate sensor data associated with the vehicle 106, lane data, traffic data, theft data, and the like. In accordance with an embodiment, the sensor data may be generated by the vehicle 106, when one or more sensors on-board the vehicle 106 may sense information relating to, for example, people in a vicinity of the vehicle 106, and so forth. In accordance with an embodiment, the vehicle 106 may generate the sensor data in real-time and transmit it to the system 100 to secure the vehicle 106. In certain cases, the subject vehicle 106 may be configured to send updated sensor data periodically, for example, every five seconds, every thirty seconds, every minute, and so forth.

Each of the set of UEs 108 may include suitable logic, circuitry, interfaces, and/or code that may be configured to transmit the vehicle access signal for controlling one or more vehicle operations associated with the vehicle 106. The set of UEs 108 may include the first subset of UEs 108A and the second subset of UEs 108B. The first subset of UEs 108A may be associated with the user 110 who is authorized to use the vehicle 106 whereas the second subset of UEs 108B may be associated with the unauthorized user 112.

In an embodiment, both the first subset of UEs 108A and the second subset of UEs 108B may be configured to transmit the vehicle access signal for controlling one or more vehicle operations of the vehicle 106 whereas only the first subset of UEs 108A may be configured to transmit the response to the authentication request as described in FIG. 3. Examples of set of UEs 108 may include, but are not limited to, a key fob, a key card, a wearable device, a computing device, a smartphone, a cellular phone, a mobile phone, a gaming device, a consumer electronic (CE) device, a mainframe machine, a server, a computer workstation, a hacker device, a signal relaying device, a hacking toolkit, and/or any other device with signal transmission and receiving capabilities.

The mapping platform 102 may comprise suitable logic, circuitry, and interfaces that may be configured to store one or more map attributes and sensor data associated with traffic on link segments and lane segments. The mapping platform 102 may be configured to store and update map data indicating the traffic data along with other map attributes, road attributes, and traffic entities, in the map database 104. The mapping platform 102 may include techniques related to, but not limited to, geocoding, routing (multimodal, intermodal, and unimodal), clustering algorithms, machine learning in location-based solutions, natural language processing algorithms, and artificial intelligence algorithms. Data for different modules of the mapping platform 102 may be collected using a plurality of technologies including, but not limited to drones, sensors, connected cars, cameras, probes, and chipsets. In some embodiments, the mapping platform 102 may be embodied as a chip or chip set. In other words, the mapping platform 102 may comprise one or more physical packages (such as chips) that include materials, components and/or wires on a structural assembly (such as a baseboard).

In some example embodiments, the mapping platform 102 may include the processing server 102A for carrying out the processing functions associated with the mapping platform 102 and the map database 104 for storing map data. The map data may correspond to radio map data. In an embodiment, the processing server 102A may include one or more processors configured to process requests received from the system 100. The processors may fetch sensor data and/or radio map data from the map database 104 and transmit the same to the system 100 in a format suitable for use by the system 100.

Continuing further, the map database 104 may comprise suitable logic, circuitry, and interfaces that may be configured to store the radio map data, for example as communication signal data records 712. The radio Map data (also referred to as Radio Frequency (RF) map data) may refer to a collection of information that characterizes a propagation of radio frequency (RF) signals in a specific environment. This data may be used in various wireless communication systems, such as Wi-Fi, cellular networks, and other wireless technologies, to model how radio signals behave in different physical spaces. Furthermore, this data helps optimize network performance, plan coverage, and mitigate interference. In an embodiment, the radio map data may be stored as a radio map.

The radio map (also referred to as a Radio Frequency (RF) map or a wireless coverage map), may correspond to graphical representations that may visualize a strength and a coverage of communication signals in a geographical area. The radio maps may provide insights into how wireless signals propagate, where the signal strengths are strong or weak, and where the potential sources of interference might exist. In an embodiment, the radio maps may provide information related to signal strength mapping. The signal strength mapping may show how signal strength varies across the geographical area. This may be often represented using color codes or contour lines. The areas with strong signals may usually be represented with e.g., vibrant colors, while the areas with weak signals may be depicted with e.g., lighter colors. In another embodiment, the radio maps include geographical features, such as buildings, walls, terrain, and other structures that may influence signal propagation. This may help in the identification of areas with potential signal blockages or reflections. The radio maps may display signal strength data for specific frequency bands, such as 2.4 GHz or 5 GHz for Wi-Fi networks, or different cellular bands for cellular networks. Furthermore, the radio maps may also provide information about sources of interference or noise that might affect signal quality. In accordance with an embodiment, the radio data may be updated in real-time or near real-time such as within a few hours, a few days, or on a weekly basis, to provide accurate and up-to-date data.

In one embodiment, the communication network 122 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 102, the services platform 118, the set of UEs 108, and/or the content providers 120 communicate with each other and other components of the system 100 using well known, new or still developing protocols. In this context, a protocol includes a set of rules defining how the network nodes within the communication network 122 interact with each other based on information sent over the communication links. The protocols are effective at different layers of operation within each node, from generating and receiving physical signals of several types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that protocol. In some protocols, the packet includes (3) trailer information following the payload and indicating the end of the payload information. The header includes information such as the source of the packet, its destination, the length of the payload, and other properties used by the protocol. Often, the data in the payload for the protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 7:
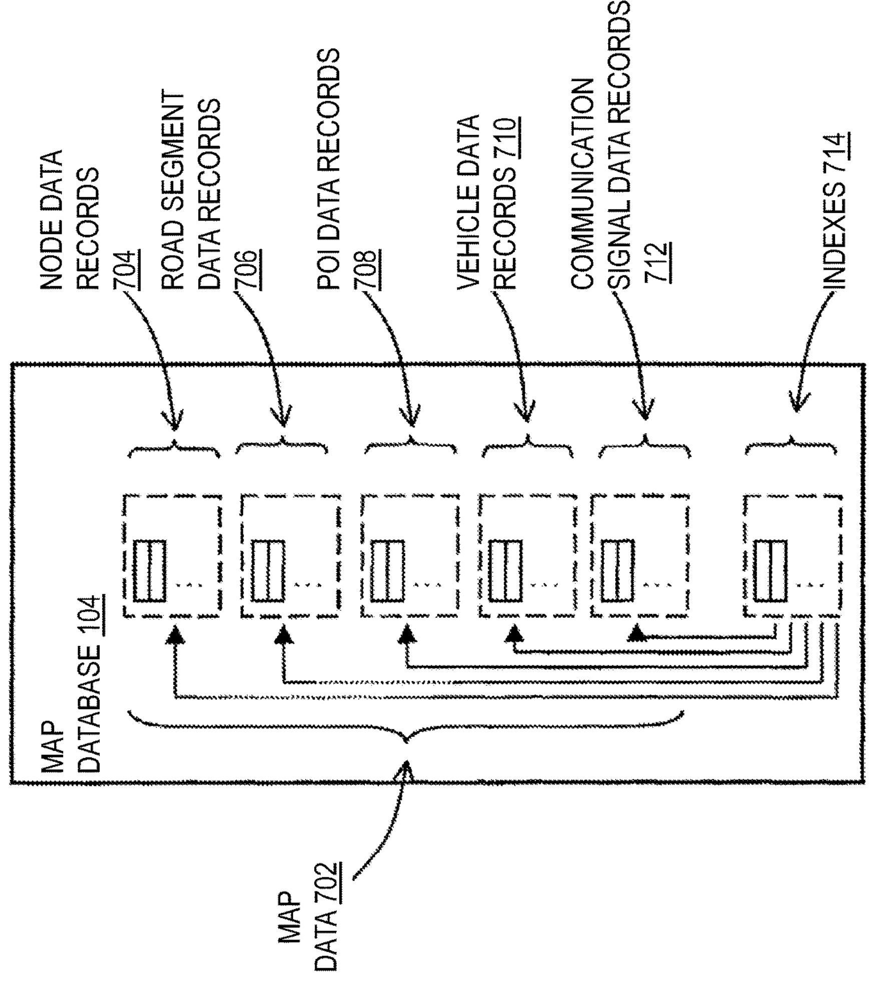
FIG. 7 is a diagram of a map database, according to one embodiment.

FIG. 7 is a diagram of the map database 104, according to one embodiment. In one embodiment, the map database 104 includes map data 702 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the map data 702. In one embodiment, the map database 104 includes high definition (HD) mapping data that provide centimeter-level or better accuracy of map features. For example, the map database 104 can be based on Light Detection and Ranging (LiDAR) or equivalent technology to collect billions of 3D points and model road surfaces and other map features down to the number lanes and their widths. In one embodiment, the HD mapping data and/or other mapping data of the map database 104 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, map features (e.g., two-dimensional, or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective map features. In the case of a building, a two-dimensional polygon can be used to represent a footprint of the building, and a three-dimensional polygon extrusion can be used to represent the three-dimensional surfaces of the building.

Accordingly, the terms polygons and polygon extrusions as used herein can be used interchangeably.

In one embodiment, the following terminology applies to the representation of map features in the map database 104.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the map database 104 follows certain conventions. For example, links do not cross themselves and do not cross each other except at a node. Also, there are no duplicated shape points, nodes, or links. Two links that connect each other have a common node. In the map database 104, overlapping map features are represented by overlapping polygons. When polygons overlap, the boundary of one polygon crosses the boundary of the other polygon. In the map database 104, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the map database 104 includes node data records 704, road segment or link data records 706, POI data records 708, vehicle data records 710, communication signal data records 712, and indexes 714, for example. In some examples, vehicle data may be stored as the node data records 704, the road segment or the link data records 706, the POI data records 708, the vehicle data records 710, the communication signal data records 712, and the indexes 714. More, fewer, or different data records can be provided. In some embodiments, the vehicle data records 710 may be stored in the map database 104. In one embodiment, additional data records (not shown) can include cartographic ("carto") data records, routing data, and maneuver data. In one embodiment, the indexes 714 may improve the speed of data retrieval operations in the map database 104. In one embodiment, the indexes 714 may be used to quickly locate data without having to search every row in the map database 104 every time it is accessed. For example, in one embodiment, the indexes 714 can be a spatial index of the polygon points associated with stored feature polygons. In one or more embodiments, data of a data record may be attributes of another data record.

In exemplary embodiments, the road segment data records 706 are links or segments representing roads, streets, paths, or bicycle lanes, as can be used in the calculated route or recorded route information for determination of speed profile data. The node data records 704 are end points (for example, representing intersections or an end of a road) corresponding to the respective links or segments of the road segment data records 706. The road segment data records 706 and the node data records 704 represent a road network, such as used by vehicles, cars, and/or other entities. Alternatively, the map database 104 can contain path segment and node data records or other data that represent pedestrian paths or areas in addition to or instead of the vehicle road record data, for example.

The road/link segments and nodes can be associated with attributes, such as map coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The map database 104 can include data about the POIs and their respective locations in the POI data records 708. The map database 104 can also include data about road attributes (e.g., traffic lights, stop signs, yield signs, roundabouts, lane count, road width, lane width, etc.), places, such as cities, towns, or other communities, and other map features, such as bodies of water, mountain ranges, etc. Such place or map feature data can be part of the POI data records 708 or can be associated with POIs or POI data records 708 (such as a data point used for displaying or representing a position of a city).

In one embodiment, the map database 104 can also include the vehicle data records 710 for storing the vehicle data, and/or any other related data that is used or generated according to the embodiments described herein. By way of example, the vehicle data records 710 can be associated with one or more of the node data records 704, the road segment data records 706, and/or the POI data records 708 to associate the speed profile data records with specific places, POIs, map areas, and/or other map features. In this way, the linearized data records can also be associated with the characteristics or metadata of the corresponding node data records 704, 706, and/or 708.

In one embodiment, as discussed above, the communication signal data records 712 may comprise data records pertaining to signal dead zones, radio maps, signal dispersion models, and the like. The communication signal data records 712 may indicate locations, dimensions or other characteristics of the signal dead zones, radio maps. Further, the communication signal data records 712 may comprise signal dispersion models specific to different communication frequencies, environments, antenna arrangements, communication device specifications (such as set of UEs 108 or communication adapters of vehicle 106), or the like.

In one embodiment, the map database 104 can be maintained by the content provider 120 in association with the mapping platform 102 (e.g., a map developer or service provider). The map developer can collect map data to generate and enhance the map database 104. There can be different ways used by the map developer to collect data. These ways can include obtaining data from other sources, such as municipalities or respective map authorities. In addition, the map developer can employ field personnel to travel by vehicle along roads throughout the map region to observe features and/or record information about them, for example. Also, remote sensing, such as aerial or satellite photography, can be used.

The map database 104 can be a master map database stored in a format that facilitates updating, maintenance, and development. For example, the master map database or data in the master map database can be in an Oracle spatial format or other format (e.g., capable of accommodating multiple/different map layers), such as for development or production purposes. The Oracle spatial format or development/production database can be compiled into a delivery format, such as a map data files (GDF) format. The data in the production and/or delivery formats can be compiled or further compiled to form map database products or databases, which can be used in end user navigation devices or systems.

For example, map data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicle and/or the set of UEs 108. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

The processes described herein for processing the vehicle data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 is a diagram of hardware that can be used to implement an embodiment. Computer system 800 is programmed (e.g., via computer program code or instructions) for processing the vehicle data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to securing the vehicle 106 from relay attacks using the map database 104. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

The computer system 800 also includes a memory 804 coupled to bus 810. The memory 804, such as a random access memory (RAM) or other dynamic storage device, stores information including processor instructions for securing the vehicle 106 from the relay attacks using the map database 104. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, which is not changed by the computer system 800. Some memory is composed of volatile storage that loses the information stored thereon when power is lost. Also coupled to the bus 810 is a non-volatile (persistent) storage device 808, such as a magnetic disk, optical disk, or flash card, for storing information, including instructions, which persists even when the computer system 800 is turned off or otherwise loses power.

Information, including instructions for securing the vehicle 106 from the relay attacks using the map database 104, is provided to the bus 810 for use by the processor from an external input device 812, such as a keyboard containing alphanumeric keys operated by a human user, or a sensor. A sensor detects conditions in its vicinity and transforms those detections into physical expressions compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 818, is coupled to the bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 800 also includes one or more instances of a communications interface 820 coupled to bus 810. The communication interface 820 provides a one-way or two-way communication coupling to a variety of external devices that operate with their own processors, such as printers, scanners, and external disks. In general, the coupling is with a network link 822 that is connected to a local network 824 to which a variety of external devices with their own processors are connected. For example, the communication interface 820 may be a parallel port or a serial port or a universal serial bus (USB) port on a personal computer. In some embodiments, communications interface 820 is an integrated services digital network (ISDN) card or a digital subscriber line (DSL) card or a telephone modem that provides an information communication connection to a corresponding type of telephone line. In some embodiments, the communication interface 820 is a cable modem that converts signals on the bus 810 into signals for a communication connection over a coaxial cable or into optical signals for a communication connection over a fiber optic cable. As another example, communications interface 820 may be a local area network (LAN) card to provide a data communication connection to a compatible LAN, such as Ethernet. Wireless links may also be implemented. For wireless links, the communications interface 820 sends or receives or both sends and receives electrical, acoustic, or electromagnetic signals, including infrared and optical signals, which carry information streams, such as digital data. For example, in wireless handheld devices, such as mobile telephones like cell phones, the communications interface 820 includes a radio band electromagnetic transmitter and receiver called a radio transceiver. In certain embodiments, the communications interface 820 enables connection to the communication network 126 for securing the vehicle 106 from relay attacks using the map database 104.

The term computer-readable medium is used herein to refer to any medium that participates in providing information to processor 802, including instructions for execution. Such a medium may take many forms, including, but not limited to, non-volatile media, volatile media, and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 822 typically provides information communication using transmission media through one or more networks to other devices that use or process the information. For example, the network link 822 may provide a connection through local network 824 to a host computer 826 or to equipment 828 operated by an Internet Service Provider (ISP). The equipment 828 in turn provides data communication services through the public, world-wide packet-switching communication network of networks now commonly referred to as the Internet 830.

A computer called a server host 832 connected to the Internet hosts a process that provides a service in response to information received over the Internet. For example, server host 832 hosts a process that provides information representing video data for presentation at display 814. It is contemplated that the components of system can be deployed in various configurations within other computer systems, e.g., host computer 826 and server 832.

FIG. 9 is a diagram of a chip set 900 that can be used to implement an embodiment. The chip set 900 is programmed to secure the vehicle 106 from the relay attacks using the map database 104 as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 902 for passing information among the components of the chip set 900. A processor 904 has connectivity to the bus 902 to execute instructions and process information stored in, for example, a memory 906. The processor 904 may include one or more processing cores with each core configured to perform independently. A multi-core processor enables multiprocessing within a single physical package. Examples of a multi-core processor include two, four, eight, or greater numbers of processing cores. Alternatively, or in addition, the processor 904 may include one or more microprocessors configured in tandem via the bus 902 to enable independent execution of instructions, pipelining, and multithreading. The processor 904 may also be accompanied with one or more specialized components to perform certain processing functions and tasks such as one or more digital signal processors (DSP) 908, or one or more application-specific integrated circuits (ASIC) 910. A DSP 908 typically is configured to process real-world signals (e.g., sound) in real time independently of the processor 904. Similarly, an ASIC 910 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 904 and accompanying components have connectivity to the memory 906 via the bus 902. The memory 906 includes both dynamic memory (e.g., RAM, magnetic disk, writable optical disk, etc.) and static memory (e.g., ROM, CD-ROM, etc.) for storing executable instructions that when executed perform the inventive steps described herein to process the vehicle data. The memory 906 also stores the data associated with or generated by the execution of the inventive steps.

Figure 10:
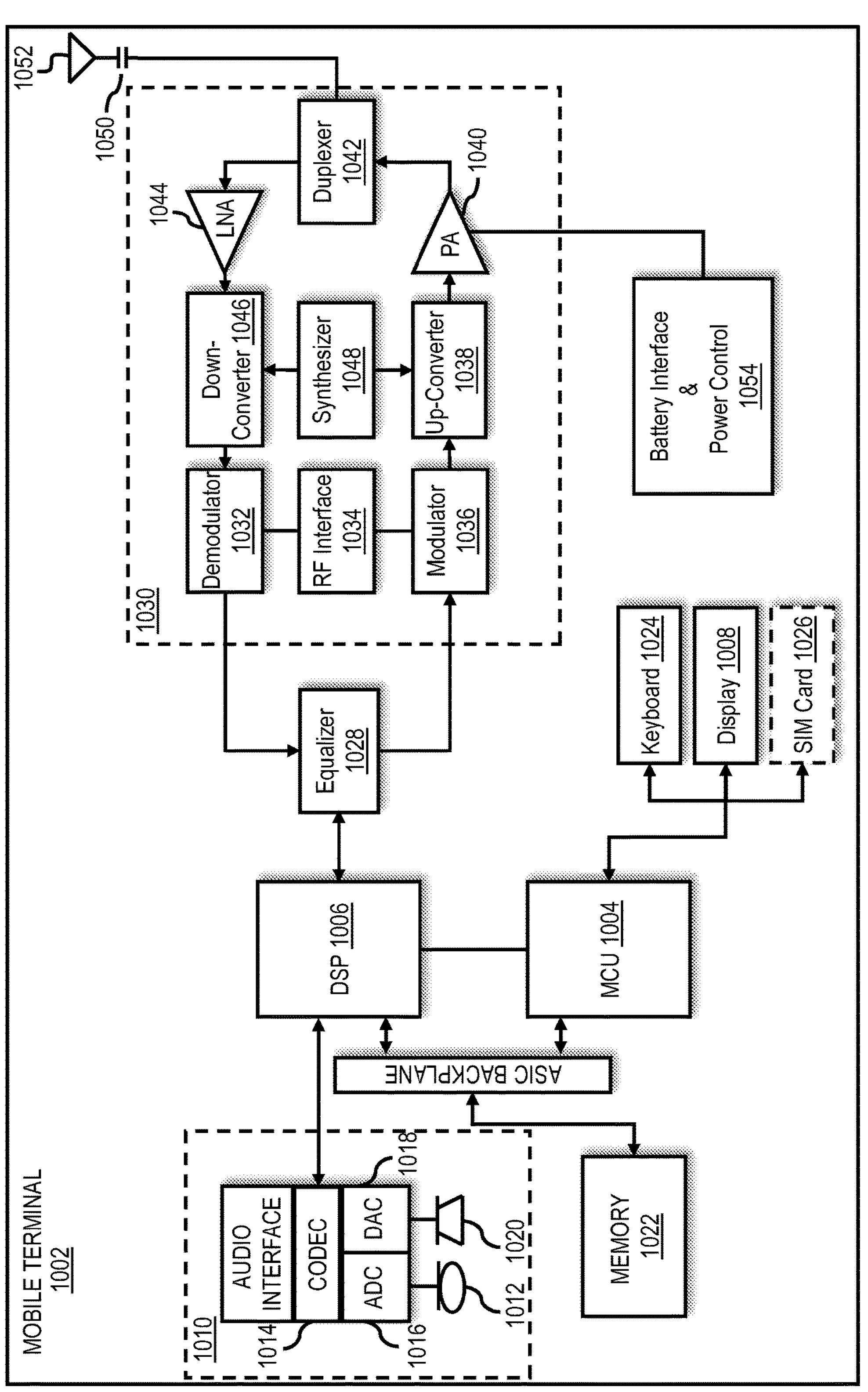
FIG. 10 is a diagram of a mobile terminal (e.g., handset, vehicle, or part thereof) that can be used to implement an embodiment.

FIG. 10 is a diagram of a mobile terminal 1002 (e.g., handset, vehicle, or part thereof) that can be used to implement an embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1004, a Digital Signal Processor (DSP) 1006, and a receiver/transmitter unit including a microphone gain control unit and a speaker gain control unit. A main display unit 1008 provides a display to the user in support of various applications and mobile station functions that offer automatic contact matching. An audio function circuitry 1010 includes a microphone 1012 and microphone amplifier that amplifies the speech signal output from the microphone 1012. The amplified speech signal output from the microphone 1012 is fed to a coder/decoder (CODEC) 1014.

A radio section 1030 amplifies power and converts frequency in order to communicate with a base station, which is included in a mobile communication system, via antenna 1052. The power amplifier (PA) 1040 and the transmitter/modulation circuitry are operationally responsive to the MCU 1004, with an output from the PA 1040 coupled to the duplexer 1042 or circulator or antenna switch, as known in the art. The PA 1040 also couples to a battery interface and power control unit 054.

In use, a user of mobile terminal 1002 speaks into the microphone 1012 and his or her voice along with any detected background noise is converted into an analog voltage. The analog voltage is then converted into a digital signal through the Analog to Digital Converter (ADC) 1016. The main control unit 1004 routes the digital signal into the DSP 1006 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (Wi-Fi), satellite, and the like.

The encoded signals are then routed to an equalizer 1028 for compensation of any frequency-dependent impairments that occur during transmission though the air such as phase and amplitude distortion. After equalizing the bit stream, the modulator 1036 combines the signal with an RF signal generated in the RF interface 1034. The modulator 1036 generates a sine wave by way of frequency or phase modulation. In order to prepare the signal for transmission, an up-converter 1038 combines the sine wave output from the modulator 1036 with another sine wave generated by a synthesizer 1048 to achieve the desired frequency of transmission. The signal is then sent through a PA 1040 to increase the signal to an appropriate power level. In practical systems, the PA 1040 acts as a variable gain amplifier whose gain is controlled by the DSP 1006 from information received from a network base station. The signal is then filtered within the duplexer 1042 and optionally sent to an antenna coupler 1050 to match impedances to provide maximum power transfer. Finally, the signal is transmitted via antenna 1052 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1002 are received via antenna 1052 and immediately amplified by a low noise amplifier (LNA) 1044. A down-converter 1046 lowers the carrier frequency while the demodulator 1032 strips away the RF leaving only a digital bit stream. The signal then goes through the equalizer 1028 and is processed by the DSP 1006. A Digital to Analog Converter (DAC) 1018 converts the signal and the resulting output is transmitted to the user through the speaker 1020, all under control of a Main Control Unit (MCU) 1004 which can be implemented as a Central Processing Unit (CPU) (not shown).

The MCU 1004 receives various signals including input signals from the keyboard 1024. The keyboard 1024 and/or the MCU 1004 in combination with other user input components (e.g., the microphone 1012) comprise a user interface circuitry for managing user input. The MCU 1004 runs a user interface software to facilitate user control of at least some functions of the mobile terminal 1002 for processing the vehicle data. The MCU 1004 also delivers a display command and a switch command to the display 1008 and to the speech output switch controller, respectively. Further, the MCU 1004 exchanges information with the DSP 1006 and can access an optionally incorporated SIM card 1026 and a memory 1022. In addition, the MCU 1004 executes various control functions required of the station. The DSP 1006 may, depending upon the implementation, perform any of a variety of conventional digital processing functions on the voice signals. Additionally, DSP 1006 determines the background noise level of the local environment from the signals detected by microphone 1012 and sets the gain of microphone 1012 to a level selected to compensate for the natural tendency of the user of the mobile terminal 1002.

The CODEC 1014 includes the ADC 1016 and DAC 1018. The memory 1022 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory 1022 may be, but not limited to, a single memory, CD, DVD, ROM, RAM, EEPROM, optical storage, or any other non-volatile or non-transitory storage medium capable of storing digital data.

An optionally incorporated SIM card 1026 carries, for instance, valuable information, such as the cellular phone number, the carrier supplying service, subscription details, and security information. The SIM card 1026 serves primarily to identify the mobile terminal 1002 on a radio network. The SIM card 1026 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system comprising:
a memory configured to store computer-executable instructions; and
one or more processors configured to execute the computer-executable instructions to:
receive a vehicle access signal comprising an electromagnetic signal via a personal area network adapter;
determine a first location of a vehicle and a first location of a user associated with the vehicle;
determine, using a location map database, at least one signal dead zone within a first pre-determined distance from the first location of the vehicle, wherein a distance between the first location of the user associated with the vehicle and the first location of the vehicle exceeds the first pre-determined distance; and
generate a validation output that validates the vehicle access signal in response to the at least one signal dead zone and the distance between the first location of the user associated with the vehicle and the first location of the vehicle exceeding the first pre-determined distance
wherein the validation output controls an access to the vehicle.

2. The system of claim 1, wherein the at least one signal dead zone is determined based on map database data corresponding to the first location of the vehicle and a signal dispersion model of a network signal at the first location of the vehicle.

3. The system of claim 2, wherein the signal dispersion model corresponds to one of: a cellular data network signal, a wireless local area network signal, a satellite data network signal, a personal wireless network signal, or a combination thereof.

4. The system of claim 3, wherein the personal wireless network signal corresponds to at least one of: a key fob, a key card, or a mobile device associated with the vehicle.

5. The system of claim 1, wherein the determination of the first location of the user associated with the vehicle comprises tracking the user within a field of view of at least one sensor mounted on the vehicle.

6. The system of claim 1, wherein the one or more processors are further configured to:
obtain the vehicle access signal over the personal area network adapter of the vehicle;
determine a second location associated with the obtained vehicle access signal; and
classify the vehicle access signal as suspicious based on the validation output, wherein the determined second location is within the at least one signal dead zone.

7. The system of claim 6, wherein the classification of the vehicle access signal as suspicious is further based on a vehicle access signal usage profile.

8. The system of claim 6, wherein the one or more processors are further configured to:
deactivate at least one vehicle operation based on the vehicle access signal being classified as suspicious; and
activate an auxiliary vehicle access mechanism.

9. The system of claim 1, wherein the one or more processors are further configured to transmit a representation of the at least one signal dead zone to a location services provider, wherein the representation of the at least one signal dead zone is associated with the first location of the vehicle.

10. The system of claim 1, wherein the one or more processors are further configured to recommend a parking location to the user based on a location of the signal dead zone.

11. A method comprising:
receiving a vehicle access signal comprising an electromagnetic signal via a personal area network adapter;
determining a first location of a vehicle and a first location of a user associated with the vehicle;
determining, using a location map database, at least one signal dead zone within a first pre-determined distance from the first location of the vehicle, wherein a distance between the first location of the user associated with the vehicle and the first location of the vehicle exceeds the first pre-determined distance; and
generate a validation output that validates the vehicle access signal in response to the at least one signal dead zone and the distance between the first location of the user associated with the vehicle and the first location of the vehicle exceeding the first pre-determined distance
wherein the validation output controls an access to the vehicle.

12. The method of claim 11, wherein the at least one signal dead zone is determined based on map database data corresponding to the first location of the vehicle and a signal dispersion model of a network signal at the first location of the vehicle.

13. The method of claim 12, wherein the signal dispersion model corresponds to one of: a cellular data network signal, a wireless local area network signal, a satellite data network signal, a personal wireless network signal, or a combination thereof.

14. The method of claim 13, wherein the personal wireless network signal corresponds to at least one of: a key fob, a key card, or a mobile device associated with the vehicle.

15. The method of claim 11, further comprising:
obtaining the vehicle access signal over the personal area network adapter of the vehicle;
determining a second location associated with the obtained vehicle access signal; and
classifying the vehicle access signal as suspicious based on the validation output, wherein the determined second location is within the at least one signal dead zone.

16. The method of claim 15, wherein the classification of the vehicle access signal as suspicious is further based on a vehicle access signal usage profile.

17. The method of claim 16, further comprising:
deactivating at least one vehicle operation based on the vehicle access signal being classified as suspicious; and
activating an auxiliary vehicle access mechanism.

18. The method of claim 11, further comprising transmitting a representation of the at least one signal dead zone to a location services provider, wherein the representation of the at least one signal dead zone is associated with the first location of the vehicle.

19. The method of claim 11, further comprising recommending a parking location to the user based on a location of the signal dead zone.

20. A computer programmable product comprising a non-transitory computer-readable medium having stored thereon computer-executable instructions, which when executed by one or more processors, cause the one or more processors to carry out operations comprising:
receiving a vehicle access signal comprising an electromagnetic signal via a personal area network adapter;
determining a first location of a vehicle and a first location of a user associated with the vehicle;

determining, using a location map database, at least one signal dead zone within a first pre-determined distance from the first location of the vehicle, wherein a distance between the first location of the user associated with the vehicle and the first location of the vehicle exceeds the first pre-determined distance; and generate a validation output that validates the vehicle access signal in response to the at least one signal dead zone and the distance between the first location of the user associated with the vehicle and the first location of the vehicle exceeding the first pre-determined distance wherein the validation output controls an access to the vehicle.

* * * * *